United States Patent
Klinge et al.

(10) Patent No.: US 12,491,748 B2
(45) Date of Patent: Dec. 9, 2025

(54) DUAL REDUNDANT PICTURE FRAME REFRIGERANT SYSTEM FOR A REFRIGERATED CONTAINER

(71) Applicant: Klinge Corporation, York, PA (US)

(72) Inventors: Allan Klinge, Lititz, PA (US); Henrik Klinge, York, PA (US)

(73) Assignee: Klinge Corporation, York, PA (US)

( * ) Notice: Subject to any disclaimer, the term of this patent is extended or adjusted under 35 U.S.C. 154(b) by 150 days.

(21) Appl. No.: 18/472,639

(22) Filed: Sep. 22, 2023

(65) Prior Publication Data

US 2025/0042216 A1 Feb. 6, 2025

Related U.S. Application Data

(60) Provisional application No. 63/516,990, filed on Aug. 1, 2023.

(51) Int. Cl.
*B60H 1/00* (2006.01)
*B60P 3/20* (2006.01)

(52) U.S. Cl.
CPC ..... *B60H 1/00014* (2013.01); *B60H 1/00814* (2013.01); *B60P 3/20* (2013.01); *B60H 2001/00928* (2013.01)

(58) Field of Classification Search
CPC ...... B60H 1/00014; B60H 2001/00928; B60P 3/20
See application file for complete search history.

(56) References Cited

U.S. PATENT DOCUMENTS

| | | | | |
|---|---|---|---|---|
| 5,129,235 | A | * | 7/1992 | Renken ............... F25D 19/04 454/91 |
| 8,522,565 | B1 | * | 9/2013 | Hauck ............... F25D 19/02 62/448 |
| 2008/0307813 | A1 | * | 12/2008 | Lifson ............... F25B 49/022 700/275 |
| 2014/0150482 | A1 | * | 6/2014 | Ueno ............... H02H 7/0852 62/126 |
| 2017/0182869 | A1 | * | 6/2017 | Kujak ............... B60H 1/3228 |
| 2018/0031291 | A1 | * | 2/2018 | Kondrk ............... F25B 49/022 |
| 2018/0347896 | A1 | * | 12/2018 | Eddy ............... F25D 19/04 |
| 2020/0393880 | A1 | * | 12/2020 | Klinge ............... B60P 3/205 |

* cited by examiner

*Primary Examiner* — Lionel Nouketcha
(74) *Attorney, Agent, or Firm* — HSML P.C.

(57) ABSTRACT

A picture frame refrigerant system for a known shipping container is provided. The picture frame refrigerant system includes a refrigeration unit having a body secured to an open end of a known shipping container, a first cooling unit, a second cooling unit, and a system interface box connected to the first cooling unit and second cooling unit and adapted to power on or power off the first cooling unit and the second cooling unit in a redundant manner.

10 Claims, 17 Drawing Sheets

DUAL REDUNDANT PICTURE FRAME REFRIGERANT SYSTEM FOR A REFRIGERATED CONTAINER

CROSS-REFERENCE TO RELATED APPLICATION

The application claims the benefit of the filing date of Provisional Patent Application No. 63/516,990 filed Aug. 1, 2023, under 35 U.S. C. § 119.

FIELD OF THE INVENTION

The present invention relates to a cooling system and, more particularly, to a picture frame refrigerant system for a container.

BACKGROUND

Certain goods, such as pharmaceuticals, require a temperature-controlled supply chain, also referred to as a cold chain. During storage and shipping, for example, cold chain goods must be held within a desired temperature range. This is particularly critical for pharmaceutical or biopharmaceutical products, as even a small temperature variation can lead to expensive and time-consuming evaluations of product liability and even complete product loss. Numerous pharmaceuticals do not arrive at their destination in usable condition. Even small temperature variations in the cold chain can cost hundreds of thousands of dollars in testing and wasted supplies.

SUMMARY

A picture frame refrigerant system for a known container is provided. The picture frame refrigerant system includes a refrigeration unit having a body secured to an open end of a known shipping container, a first cooling unit, a second cooling unit, and a system interface box connected to the first cooling unit and second cooling unit and adapted to power on or power off the first cooling unit and the second cooling unit in a redundant manner.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
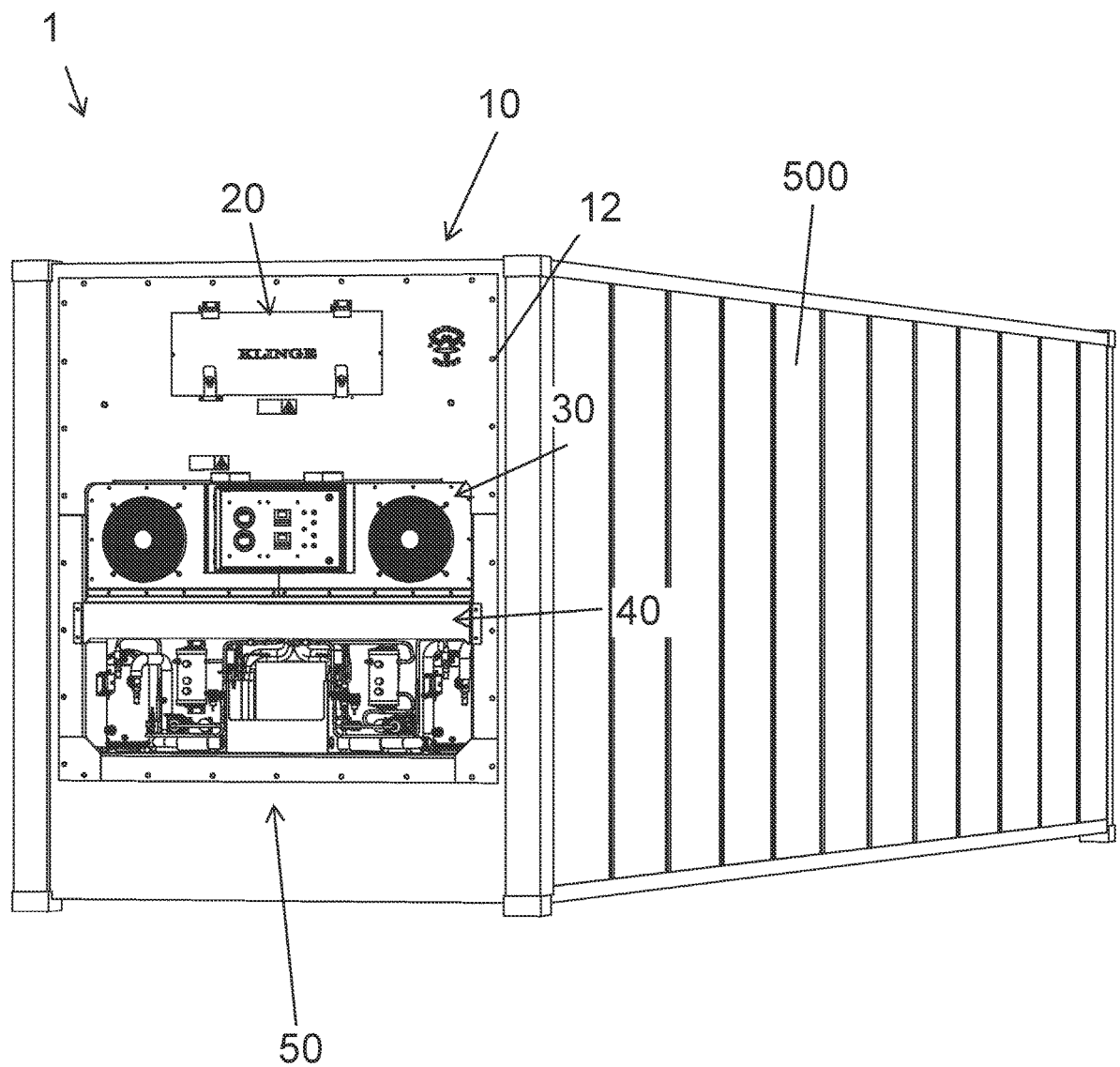
FIG. 1 is a perspective view of an exemplary embodiment of a picture frame refrigerant system according to the invention secured to a known container.

Embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the disclosure will convey the concept of the invention to those skilled in the art. A picture frame refrigerant system 1 according to an embodiment is shown throughout the Figures. The picture frame refrigerant system 1 is positioned on a known container 500. The picture frame refrigerant system 1 generally includes a refrigeration end unit 10, an evaporator enclosure 20, a cooling enclosure 30, a condenser enclosure 40, a compressor enclosure 50, a first cooling unit 200, a second cooling unit 300, and a system interface box 400 connected to the cooling units 200, 300.

Figure 2:
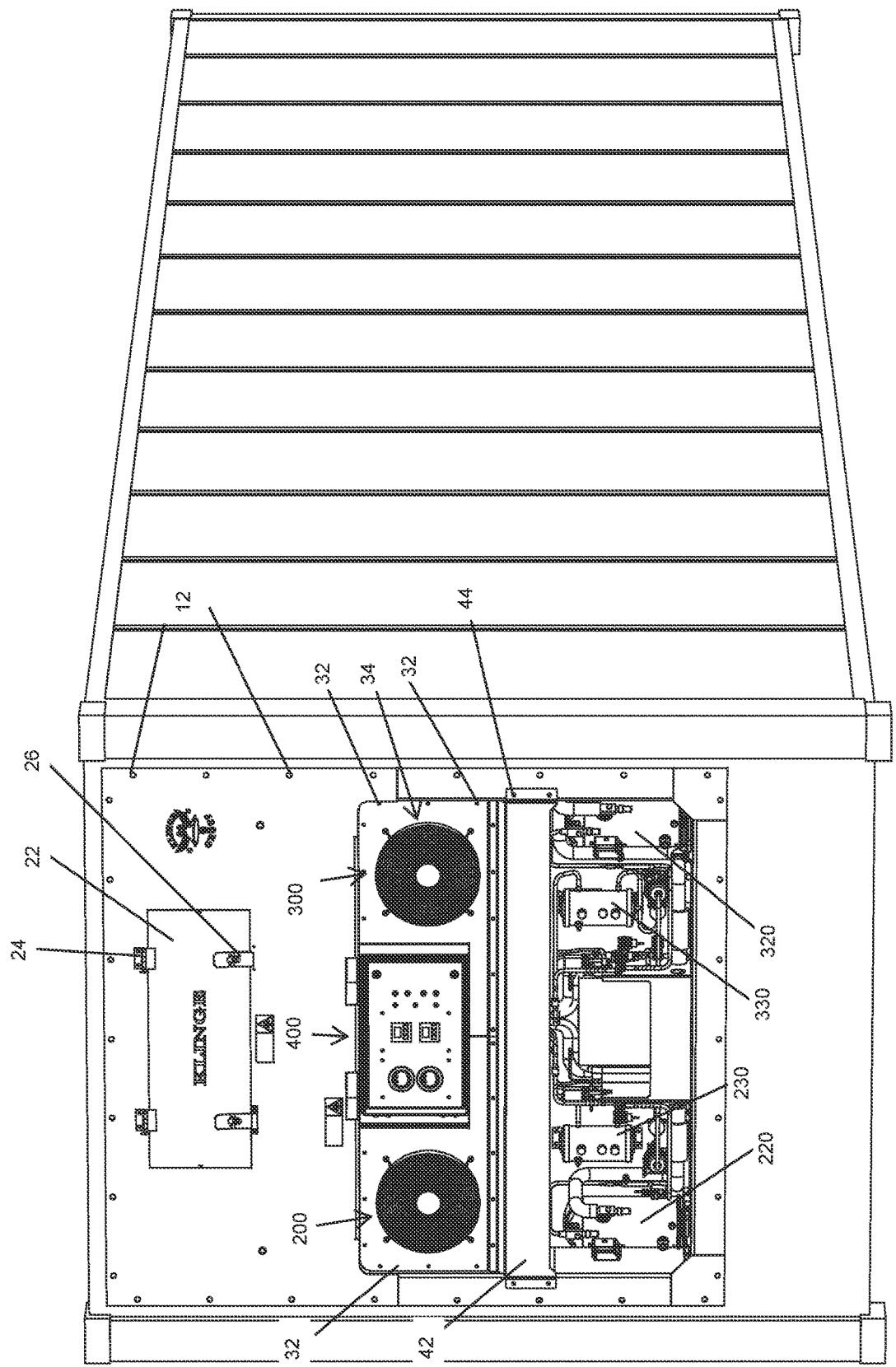
FIG. 2 is another perspective view of the picture frame refrigerant system of FIG. 1.
Figure 3:
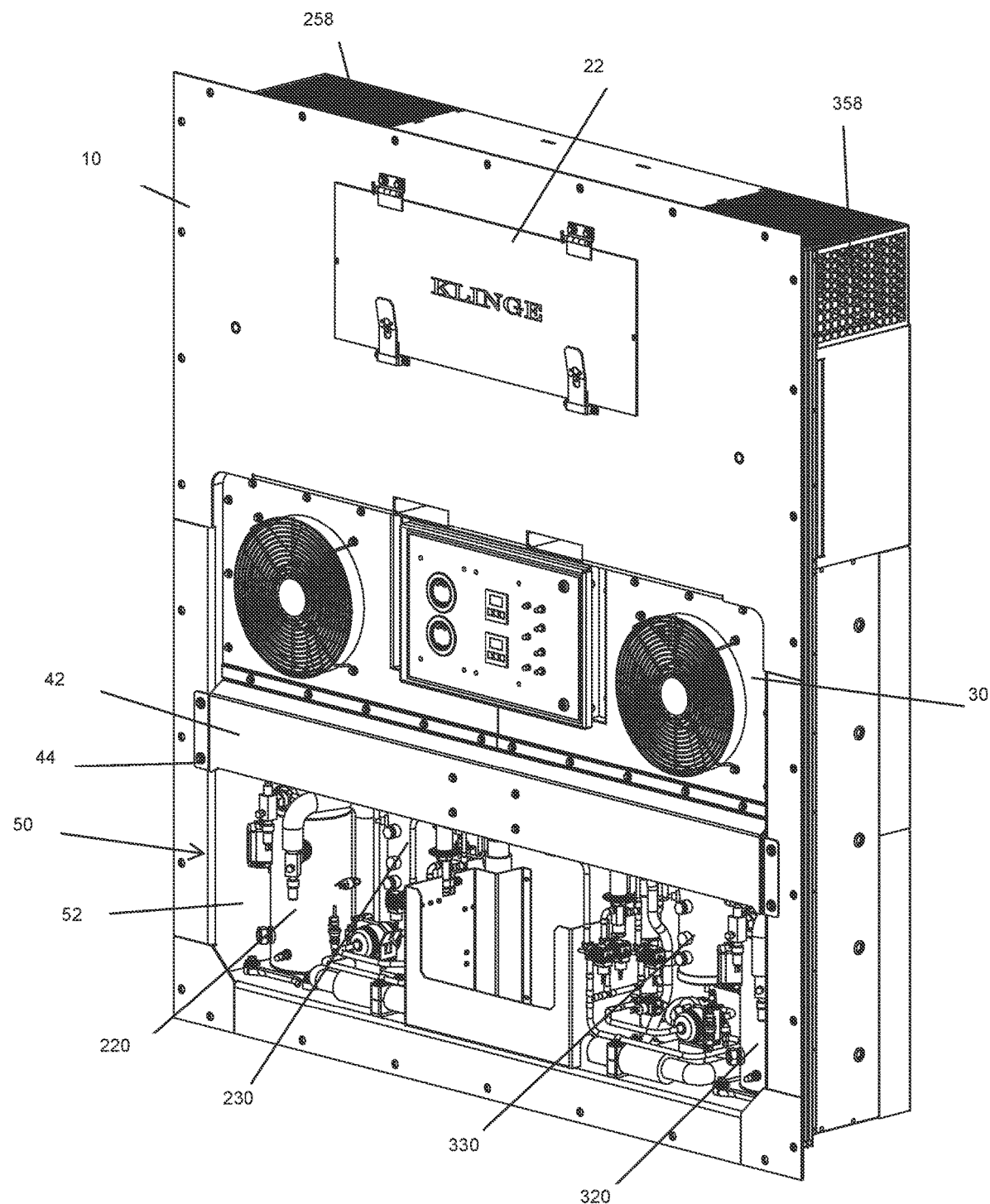
FIG. 3 is a front, top left side perspective view of a picture frame refrigerant system according to the invention.
Figure 4:
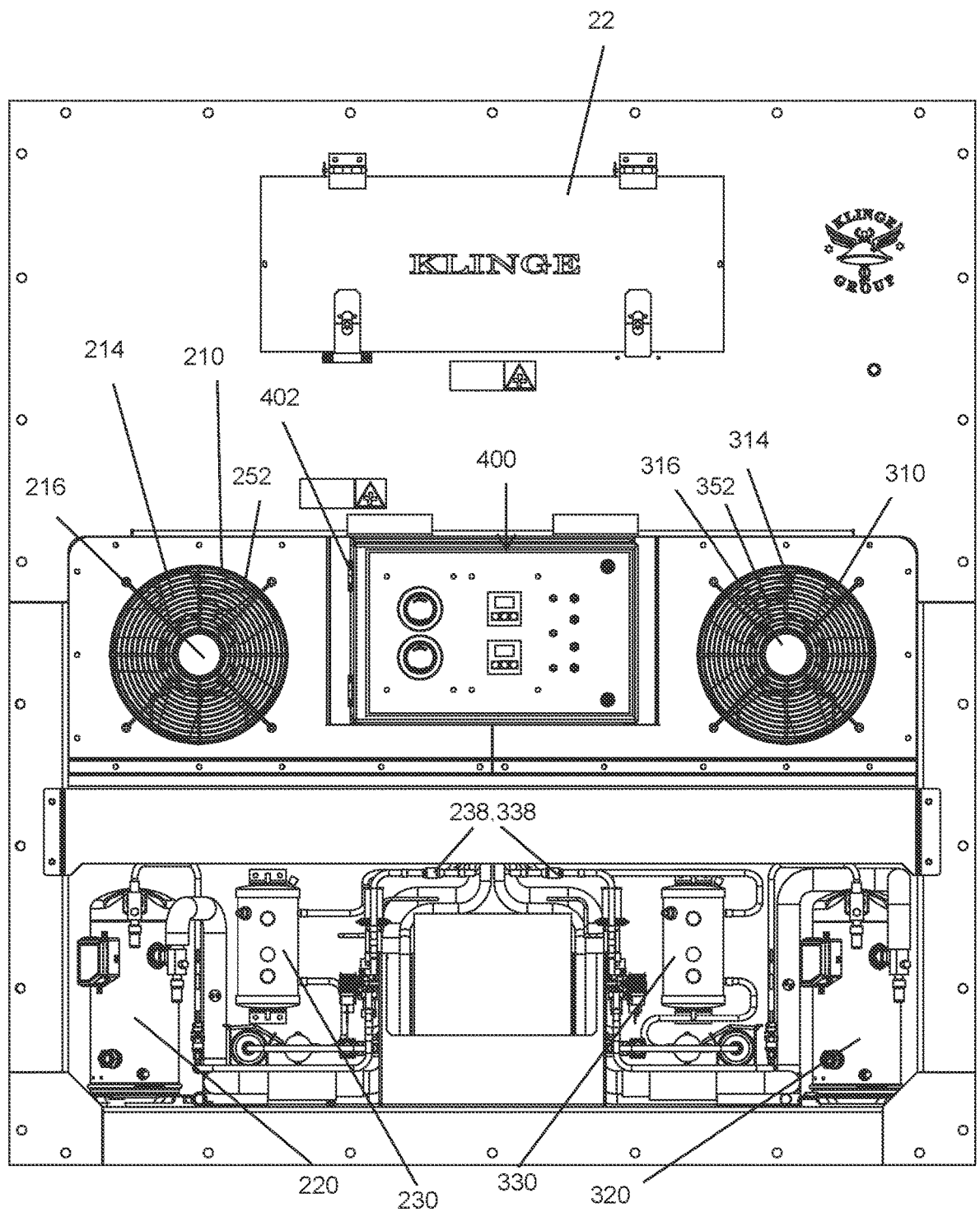
FIG. 4 is a front view of the picture frame refrigerant system of FIG. 3.
Figure 5:
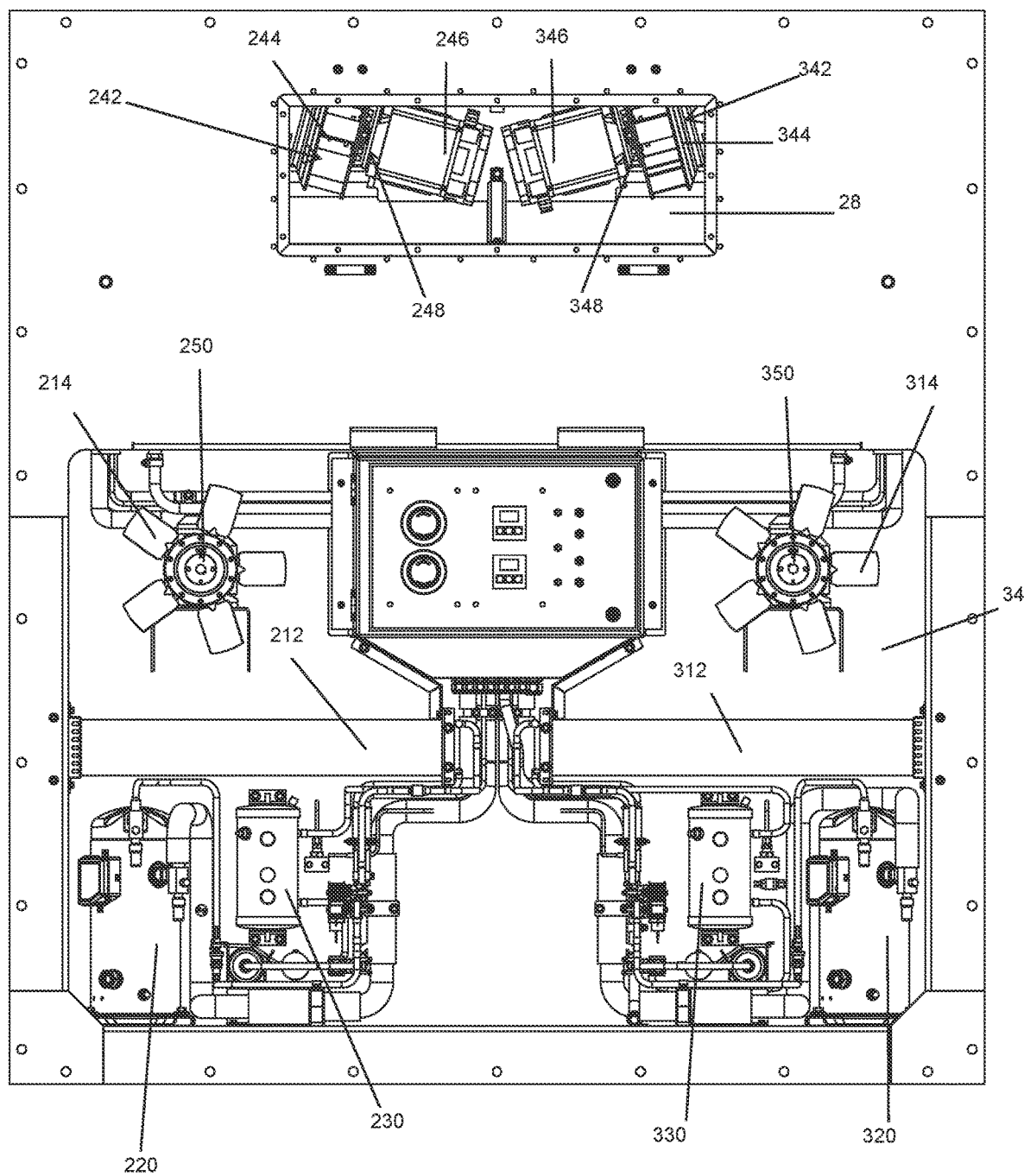
FIG. 5 is a front view of the picture frame refrigerant system showing the inner workings of the picture frame refrigerant system of FIG. 4.

As shown in FIGS. 1-3, the refrigeration end unit 10 is a picture framed enclosure positioned on and secured to an end of a known container 500. The refrigeration end unit 10 is a box like structure. The refrigeration end unit 10 extends inwards when coupled to the known container 500. The refrigeration end unit 10 includes a plurality of fasteners 12 for securing the refrigeration end unit 10 to the known container 500.

As shown, the refrigeration end unit 10 includes an evaporator enclosure 20. The evaporator enclosure 20 includes an evaporator access door 22 positioned in an upper central portion of the refrigeration end unit 10. The evaporator access door 22 includes a pair of hinges 24 coupled to the refrigeration end unit 10. The evaporator access door 22 further includes a pair of locking mechanisms 26. The pair of locking mechanisms 26 allow the evaporator access door 22 to stay closed when secured to the known refrigeration end unit 10.

As shown, the refrigeration end unit 10 further includes the cooling enclosure 30. The cooling enclosure 30 is a rectangular member extending almost the full length of the refrigeration end unit 10. The cooling enclosure 30 is positioned directly below the evaporator enclosure 20. The cooling enclosure 30 includes a plurality of fasteners 32 for securing the cooling enclosure 30 to the refrigeration end unit 10. The plurality of fasteners 32 are positioned on a perimeter of the cooling enclosure 30.

As shown, the refrigeration end unit 10 further includes a condenser enclosure 40. The condenser enclosure 40 includes a condenser coil plate 42. The condenser coil plate 42 is an elongated member extending below the cooling enclosure 30 and almost the full length of the refrigeration end unit 10. The condenser enclosure 40 further includes a plurality of fasteners 44 positioned on the perimeter of the condenser coil plate 42 for securing the condenser enclosure to the refrigeration end unit 10.

As shown, the refrigeration end unit 10 further includes a compressor enclosure 50. The compressor enclosure 50 is a recess formed within the refrigeration end unit 10 extending a width of the refrigeration end unit 10.

As shown, the first cooling unit 200 and the second cooling unit 300 are separate but each have identical components that function identically. The placement and position of respective components are mirror and unique such that the refrigeration end unit 10 is easily adapted to known containers 500.

As will become clear in the following description, identical components of the first cooling unit 200 and the second cooling unit 300 have similar reference numbers; reference numbers of identical components between the first cooling unit 200 and the second cooling unit 300 share the same last two digits. These identical components will be described and referenced together in some of the drawings and a portion of the description, in which multiple similar reference numbers reference the same component to indicate that the same component is present in the first cooling unit 200 and the second cooling unit 300. Where the identical components of the first cooling unit 200 and the second cooling unit 300 are referenced separately, the component of the first cooling unit 200 may be labeled "first" and the component of the second cooling unit 300 may be labeled "second."

Each of the first cooling unit 200 and the second cooling unit 300, as shown throughout the Figures, has a condenser 210, 310, a compressor 220, 320, an evaporator 240, 340 connected to the condenser 210, 310, and the system interface box 400 connected to and controlling the condenser 210, 310, the compressor 220, 320, and the evaporator 240, 340.

Each condenser 210, 310, as shown in the Figures, has a condenser coil 212, 312, a condenser fan 214, 314 adapted to blow air over the condenser coil 212, 312, and a condenser motor 216, 316 adapted to drive the condenser fan 214, 314. The condenser coil 212, 312 is connected to and receives a refrigerant from the compressor 220, 320. The refrigerant received at the condenser coil 212, 312 is in a vapor state with a high temperature and a high pressure. The condenser fan 214, 314 blows air over the condenser coil 212, 312, cooling the refrigerant in the condenser coil 212, 312 and turning the refrigerant into a liquid state.

As shown, each condenser 210, 310 includes a plurality of condenser coils 212, 312 separately receiving refrigerant from the compressor 220, 320. The condenser coils 212, 312 are positioned orthogonal to the condenser fan 214, 314 as shown. One skilled in the art would understand the applicant's design is not the exclusive embodiment and other positioning of the condenser coils 212, 312 with respect to the condenser fan 214, 314 may be implemented. The condenser fan 214, 314 blows air over all of the condenser coils 212, 312 and cools the refrigerant into the liquid state.

Each compressor 220, 320 provides circulation of liquid refrigerant through the first cooling unit 200 and the second cooling unit 300. Each compressor 220, 320 includes a receiving unit 230, 330 to permit each compressor 220, 320 to receive the liquid refrigerant.

Each evaporator 240, 340, as shown in the Figures, has an evaporator housing 242, 342, an evaporator fan 244, 344 disposed in the evaporator housing 242, 342, an evaporator motor 246, 346 adapted to drive the evaporator fan 244, 344, and an evaporator coil 248, 348. Each evaporator 240, 340 is connected to an output of the condenser 210, 310. The evaporator coil 248, 348 receives the refrigerant from the condenser 210, 310 in the liquid state having a low temperature and a low pressure. The refrigerant absorbs heat from the interior of the known container 500 and vaporizes in the evaporator coil 248, 348. The evaporator fan 244, 344 blows air over the evaporator coil 248, 348 and aids in the absorption of heat.

Each evaporator 240, 340, as shown, has a plurality of sensors adapted to detect temperatures within and around the evaporator 240, 340. An evaporator motor sensor 250, 350 is disposed at the evaporator motor 246, 346 and adapted to detect a temperature of the evaporator motor 246, 346. A supply air sensor 252, 352 is disposed at an outlet of the evaporator fan 244, 344 and is adapted to detect a temperature of a supply air output from the evaporator 240, 340 into the interior of the known container 500. A return air sensor 254, 354 is disposed at an inlet of the evaporator 240, 340 and is adapted to detect a temperature of a return air from the interior of the known container 500 into the evaporator 240, 340.

The evaporator coil 248, 348 is connected to an output of a hot gas solenoid valve 238, 338 of the compressor 220, 320. The hot gas solenoid valve 238, 338 can be controlled to divert the hot gas generated by compressor 220, 320 to the evaporator coil 248, 348 to heat the evaporator coil 248, 348, such as to defrost the evaporator coil 248, 348. Each evaporator 240, 340 has a defrost sensor 256, 356, as shown, disposed at and adapted to detect a temperature of the evaporator coil 248, 348. The evaporator 240, 340 further includes a plurality of vents 258, 358 positioned around a perimeter of the evaporator housing 242, 342.

The first cooling unit 200 and the second cooling unit 300, further includes a heating element 280, 380 positioned inwards and towards the known container 500. The heating element 280, 380 further includes a heating bank 282, 382 positioned below the evaporator 240, 340.

The system interface box 400, as shown, is a rectangular member. One skilled in the art would understand the applicant's design is not the exclusive embodiment. The system interface box 400, has an interface corresponding to each of the first cooling unit 200 and the second cooling unit 300. For the first cooling unit 200, as shown, the system interface box 400 has a first user interface 410 connected to a first controller 262 of the first cooling unit 200, a first alarm 430 connected to the first user interface 410, and a first switch 450 adapted to power on or power off the first cooling unit 200. The first user interface 410 has a first display 412 and a first input 414. In the shown embodiment, the first input 414 is a keypad. In other embodiments, the first input 414 may be any other type of computer input.

For the second cooling unit 300, as shown, the system interface box 400 has a second user interface 420 connected to a second controller 362 of the second cooling unit 300, a second alarm 440 connected to the second user interface 420, and a second switch 460 adapted to power on or power off the second cooling unit 300. The second user interface 420 has a second display 422 and a second input 424. In the shown embodiment, the second input 424 is a keypad. In other embodiments, the second input 424 may be any other type of computer input. The controller 262, 362 of each cooling unit 200, 300, as shown, has a processor 264, 364 and a memory 266, 366 connected to the processor 264, 364. The memory 266, 366 is a non-transitory computer readable medium capable of storing data and instructions thereon that are executable by the processor 264, 364 to perform the functions of the controller 262, 362 described herein. In various embodiments, the memory 266, 366 may be a read-only memory, a random access memory, a database, or any other type of non-transitory computer readable medium known to those with ordinary skill in the art.

As shown, the first controller 262 of the first cooling unit 200 communicates with the first user interface 410 by execution of the first processor 264. The second controller 362 of the second cooling unit 300 likewise communicates with the second user interface 420 by execution of the second processor 364. The controllers 262, 362 exchange data and control instructions with the user interfaces 410, 420 as described in greater detail below.

Figure 7:
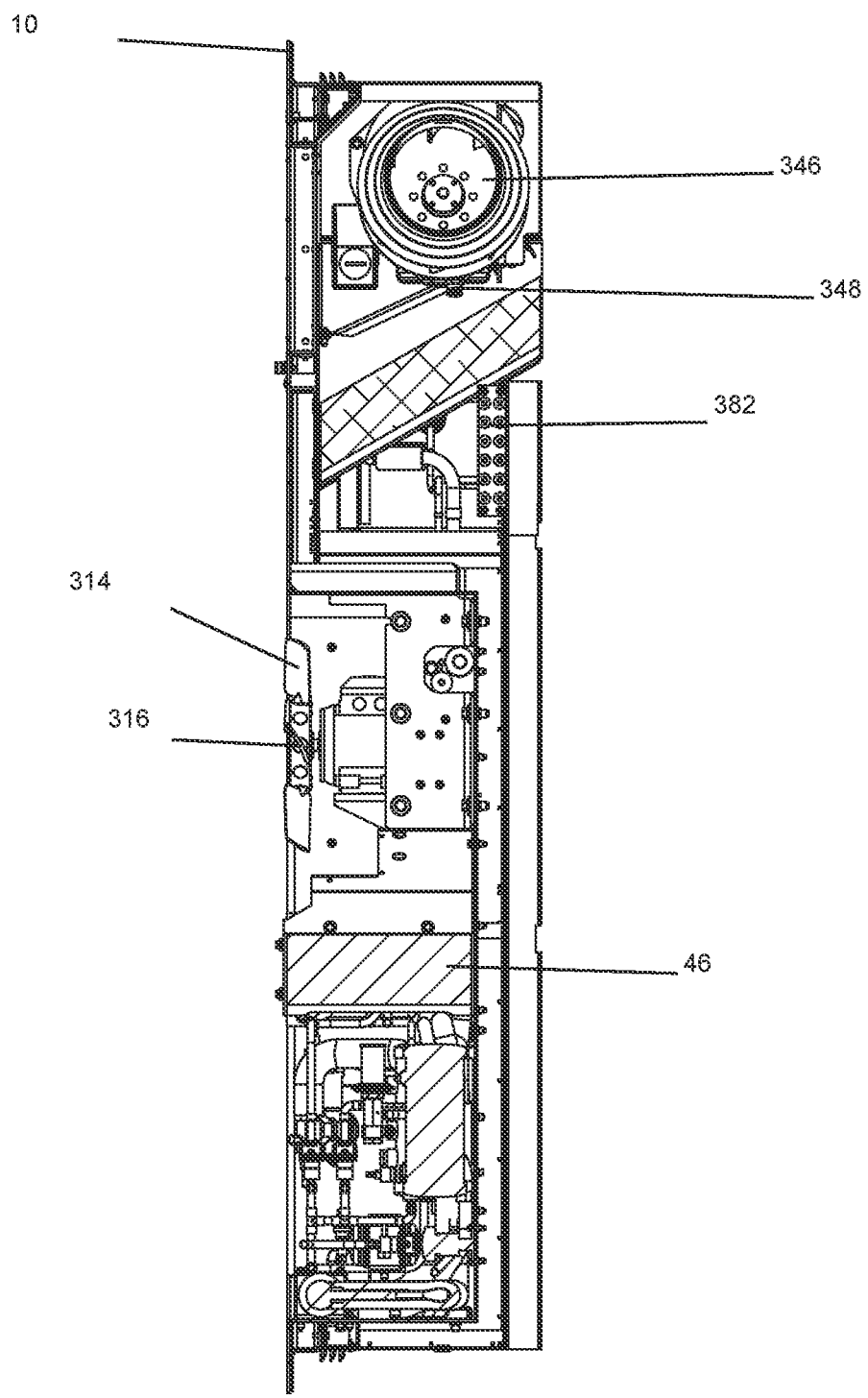
FIG. 7 is a cross section view of line 6-6 of FIG. 6.
Figure 8:
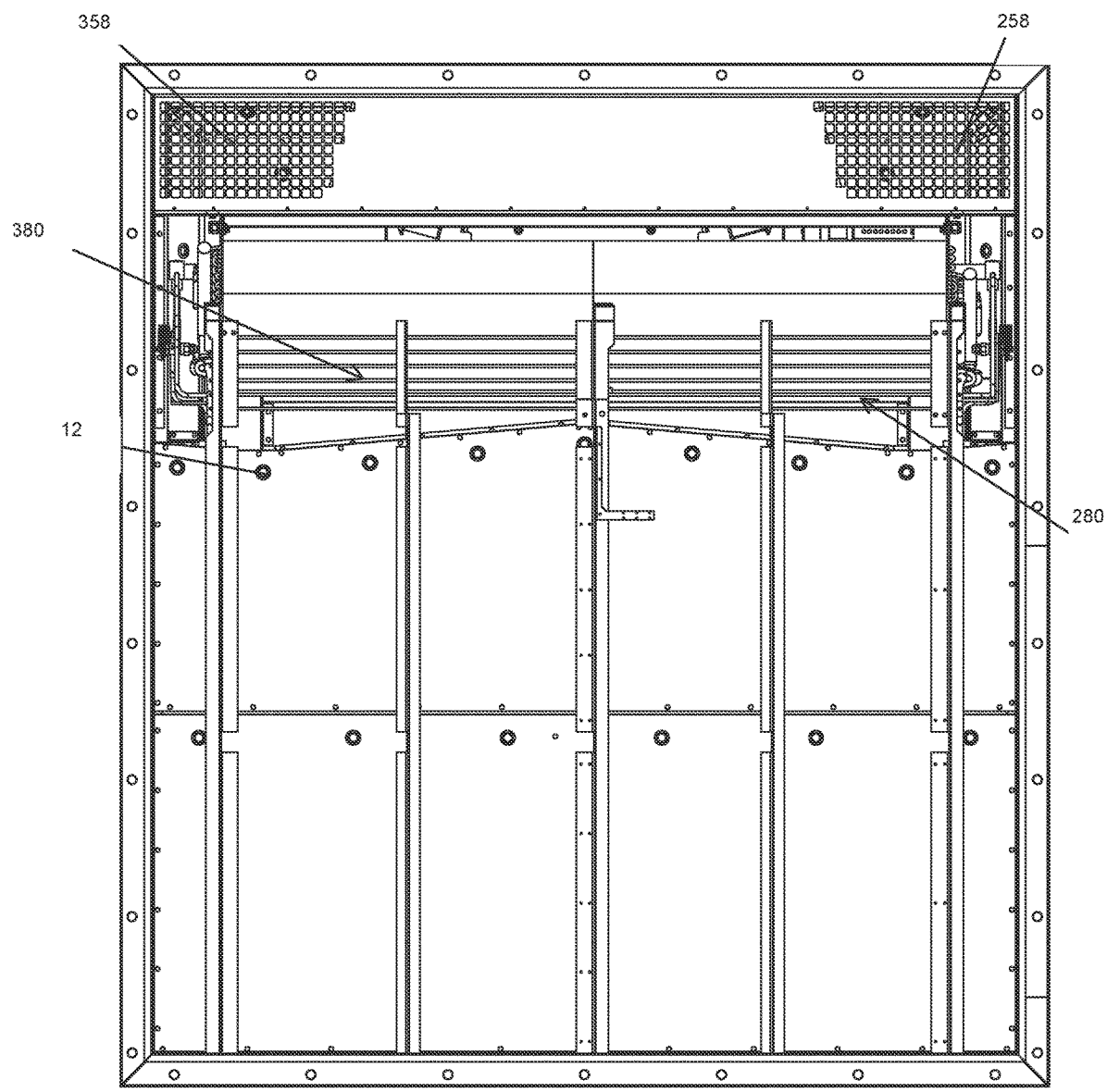
FIG. 8 is a rear view of FIG. 7.
Figure 9:
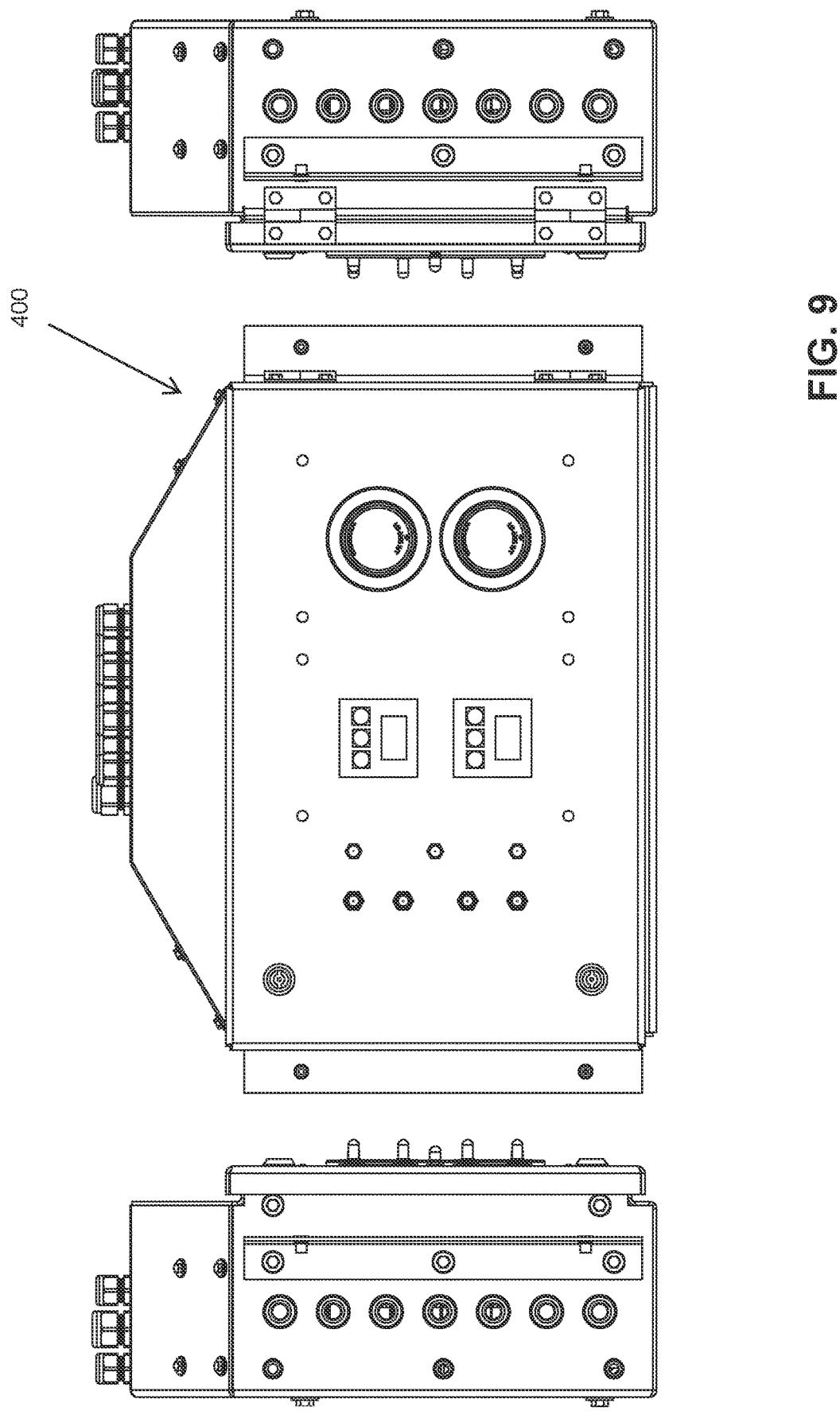
FIG. 9 a system interface box of the cooling system with a left and right view according to the invention.
Figure 10:
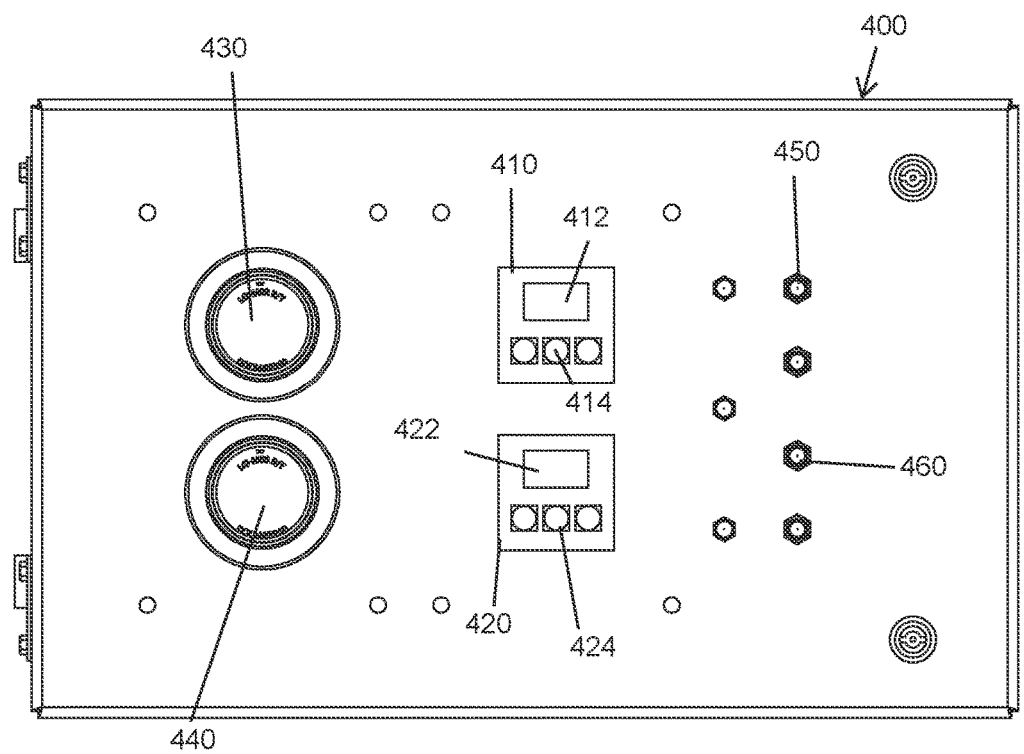
FIG. 10 is a front view of the system interface box.
Figure 11:
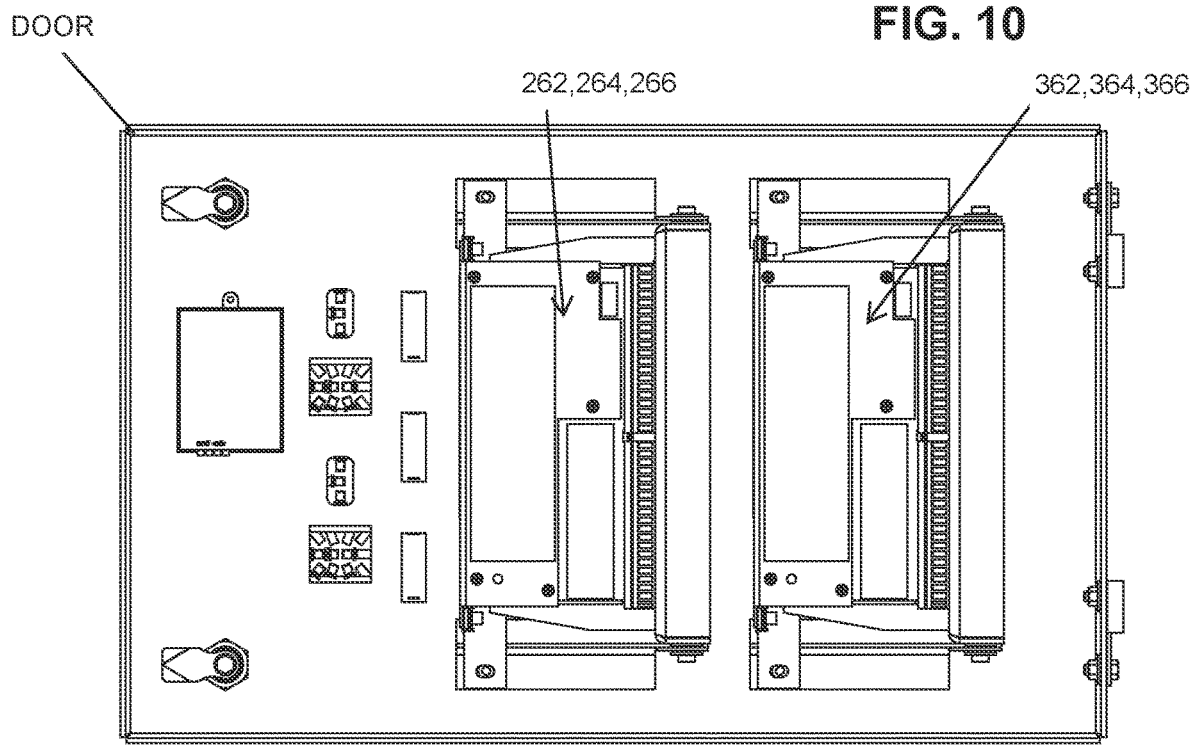
FIG. 11 is a rear view of the system interface box door and showing each controller positioned within the system interface box of FIG. 10.
Figure 12:
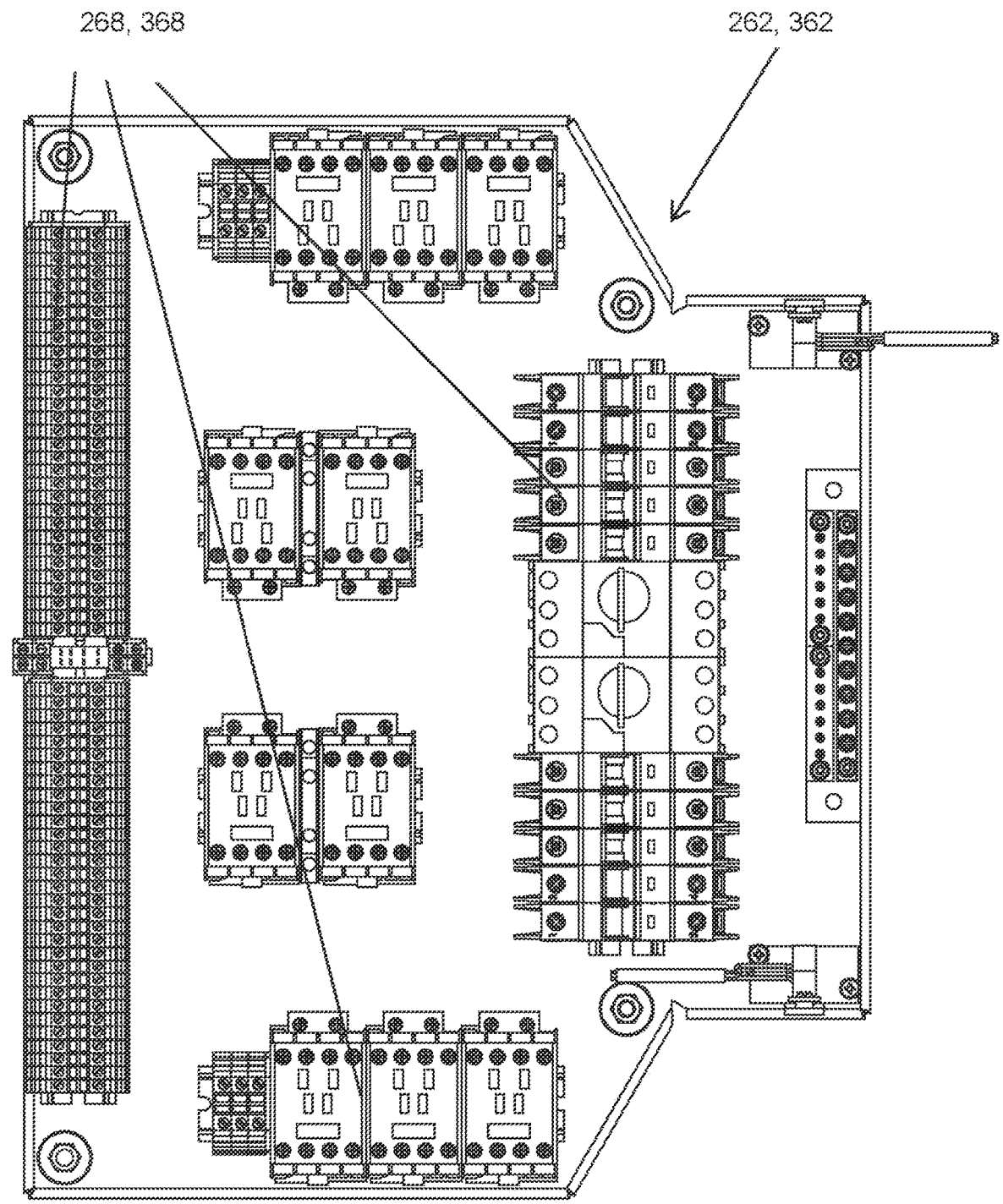
FIG. 12 is a front view of electrical switchgear positioned within the system interface box of FIG. 10.
Figure 13:
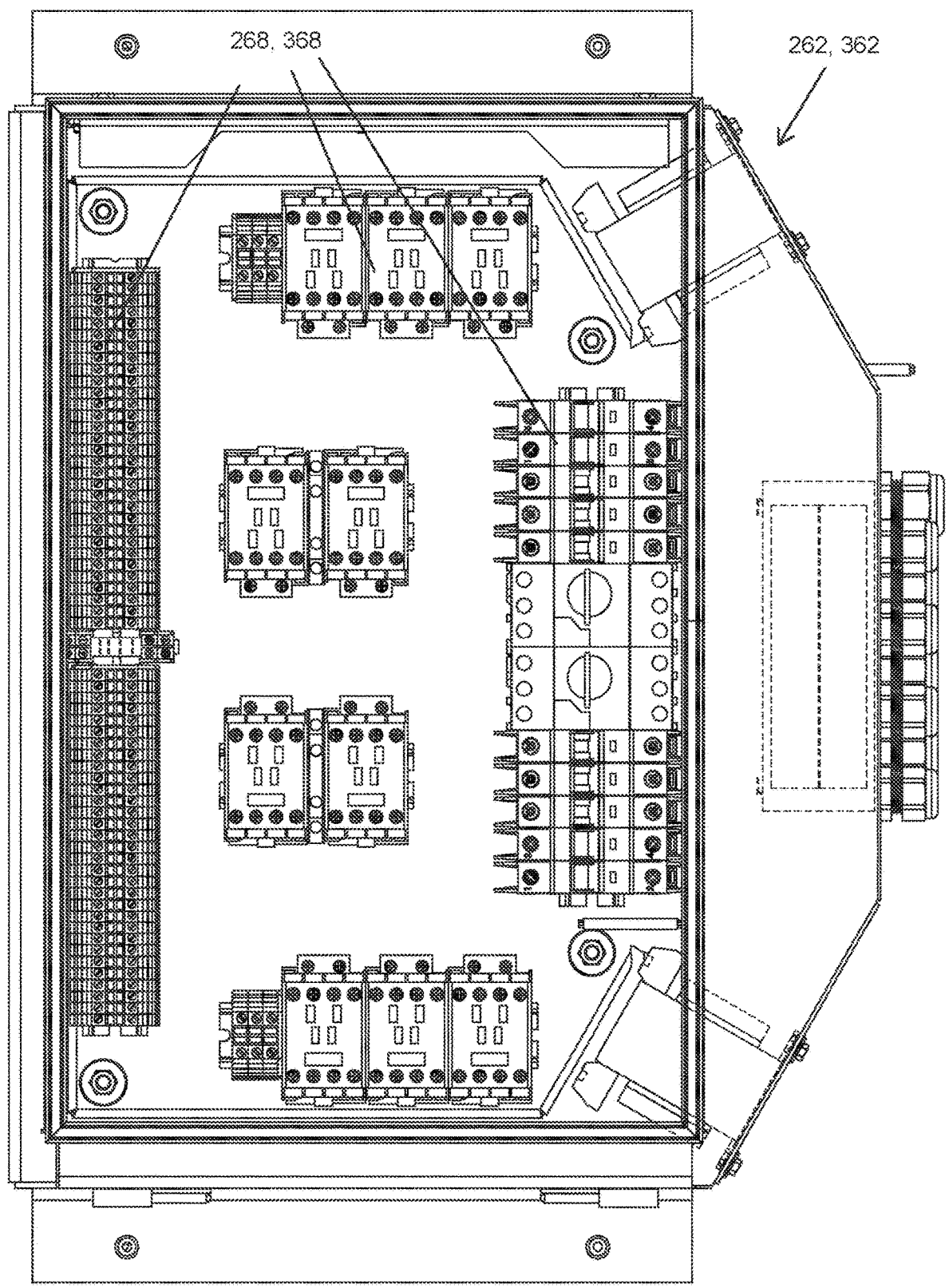
FIG. 13 is a front view of the electrical switch gear positioned within the system interface box of FIG. 10.
Figure 14:
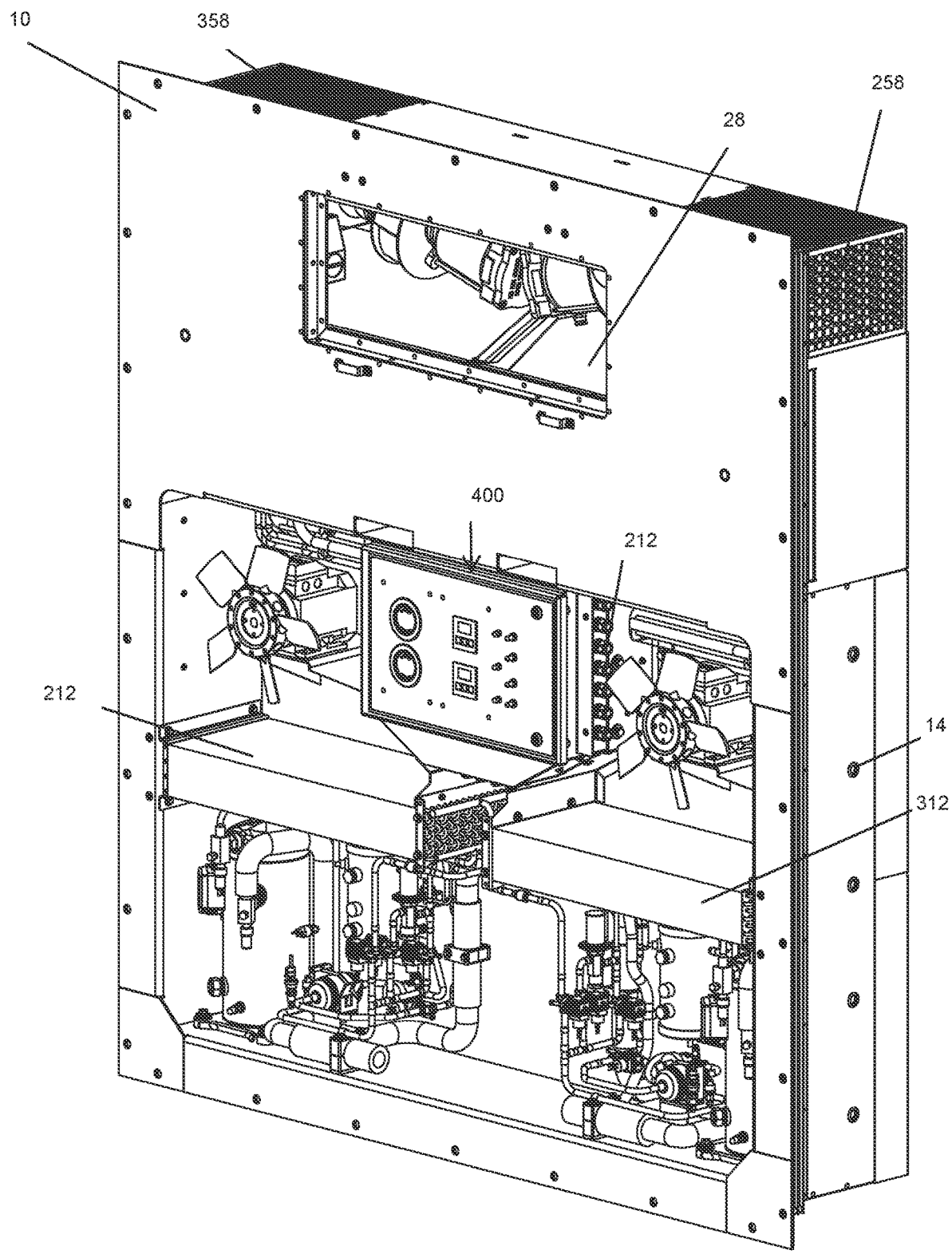
FIG. 14 is a front, top, left side view of the inner workings of the picture frame refrigerant system.
Figure 15:
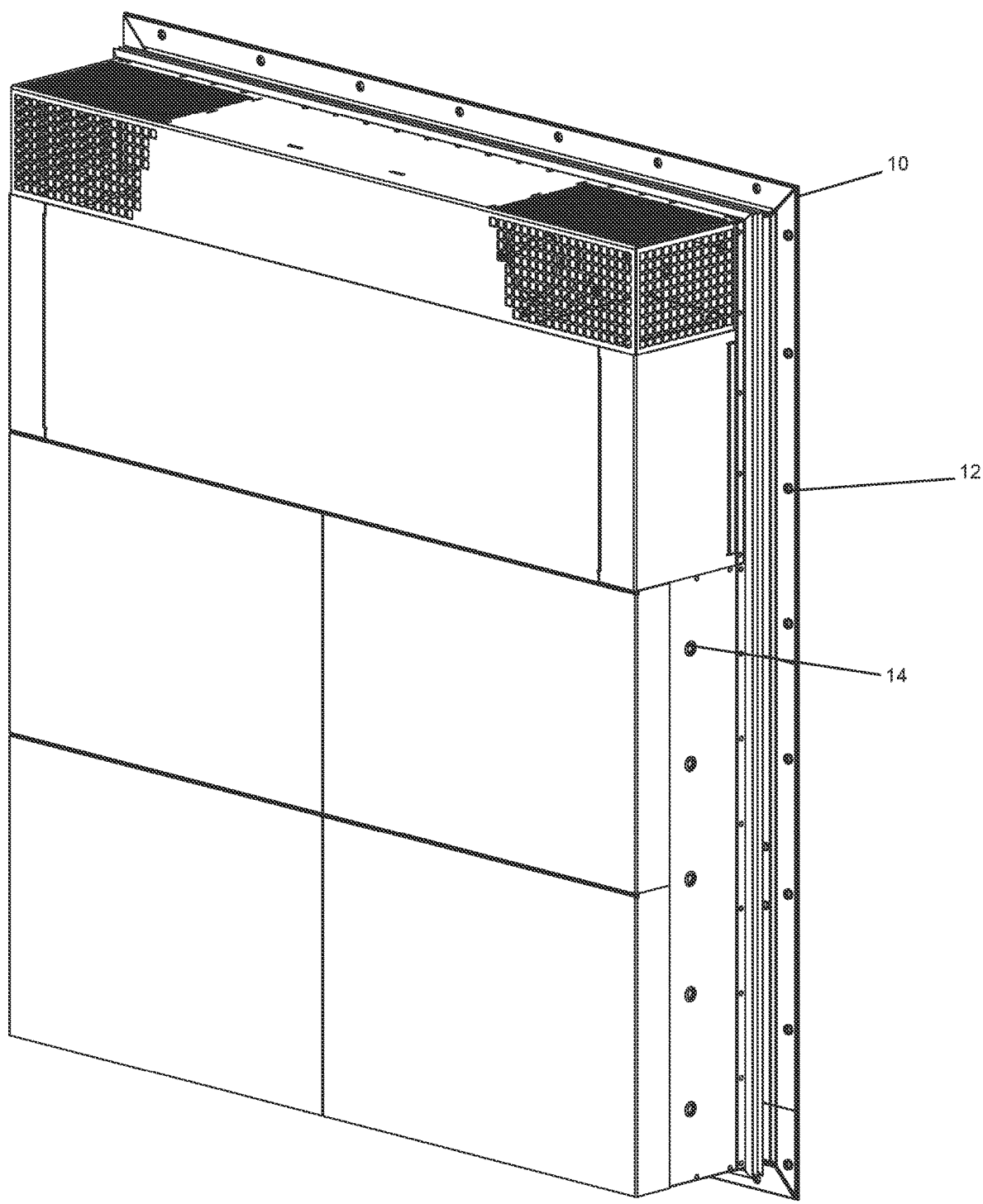
FIG. 15 is a rear, top, right side view of the picture frame refrigerant system of FIG. 14.
Figure 16:
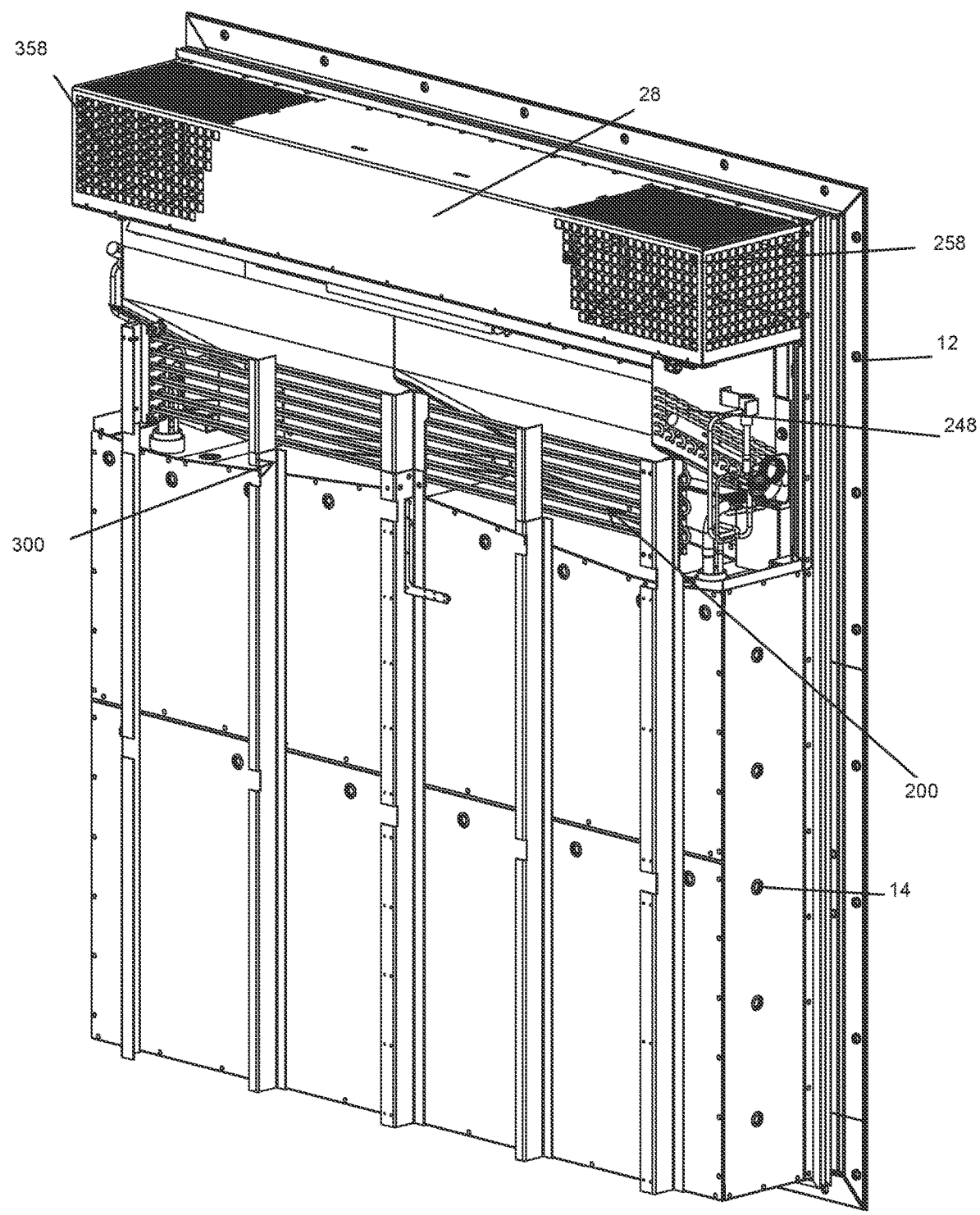
FIG. 16 a rear, top, right side view of the inner workings of the picture frame refrigerant system of FIG. 15.

As assembled, the evaporator enclosure 20 includes the evaporator access door 22 positioned in an upper central portion of the refrigeration end unit 10. The evaporator enclosure housing 28 extends inwards and the width of the refrigeration end unit 10. As shown, the evaporator enclosure housing 28 includes the evaporator housing 242, 342. The evaporator housing 242, 342 encloses the evaporator fan 244, 344. The evaporator fan 244, 344 is positioned on an angle with respect to the refrigeration end unit 10 extending outwards as shown in FIG. 7. The evaporator housing 242, 342 further encloses the evaporator motor 246, 346. The evaporator motor 246, 346 is positioned at an opposite end from the evaporator fan 244, 344. The evaporator housing 242, 342 further encloses the evaporator coil 248, 348. The evaporator coil 248, 348 is positioned below the evaporator fan 244, 344 and the evaporator motor 246, 346. The evaporator motor 246, 346 are adapted to drive the evaporator fan 244, 344, and the evaporator coil 248, 348.

The cooling enclosure 30 is positioned below the evaporator enclosure 20. The cooling enclosure 30 includes a pair of cooling unit enclosures 34 within the cooling enclosure 30. Each cooling unit enclosure 34 houses cooling unit 200, 300. Each cooling unit enclosure further houses the condenser motor 216, 316. The condenser motor 216, 316 are positioned inward of the refrigeration end unit 10 and towards the known container 500. In an opposing direction each condenser fan 214, 314 is positioned against the condenser motor 216, 316 and extending in the opposing direction.

Figure 6:
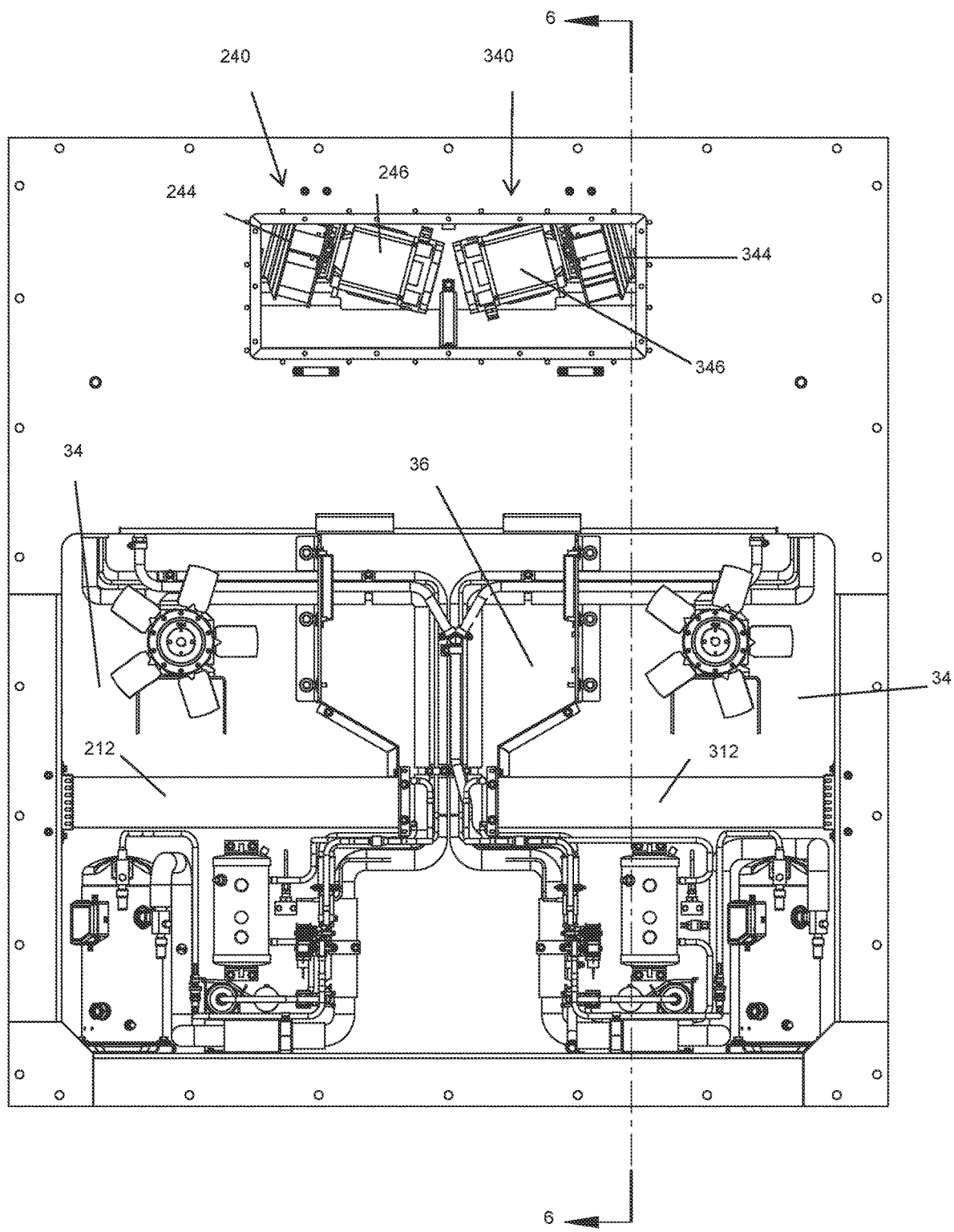
FIG. 6 is another front view of the picture frame refrigerant system without a system interface box of FIG. 5.

The cooling enclosure 30 further includes a system interface box slot 36. The system interface box slot 36 is positioned between the pair of cooling unit enclosures 34 as shown in FIG. 6. The system interface box slot 36 receives the system interface box 400. The system interface box 400 includes a pair of hinges 402 which secures a system interface box door 404 to the cooling enclosure 30.

The condenser enclosure 40 positioned adjacent the cooling enclosure 30. Specifically, the condenser enclosure 40 is positioned directly below the cooling enclosure 30. The condenser enclosure 40 includes a condenser coil housing 46. The condenser coil housing 46 is protected by the condenser coil plate 42. The condenser coil housing 46 houses the condenser coils 212, 312. As shown the condenser coils 212, 312 extend from a central portion of the condenser coil housing 46 and outwards toward an edge of the refrigeration end unit 10. The condenser coils 212, 312 are positioned orthogonal to the condenser fan 214, 314 as shown.

The compressor enclosure 50 is positioned adjacent the condenser enclosure 40. Specifically, the compressor enclosure 50 is positioned below the condenser enclosure 40. As previously noted, the compressor enclosure 50 is a recess formed within the refrigeration end unit 10 extending a width of the refrigeration end unit 10. The compressor enclosure 50 further includes a compressor housing 52. The compressor housing 52 receives the compressor 220, 320. The compressors 220, 320 are positioned towards a perimeter of the compressor housing 52. Adjacent the compressors 220, 320, the receiving units 230, 330 are positioned within the compressor housing 52.

Figure 17:
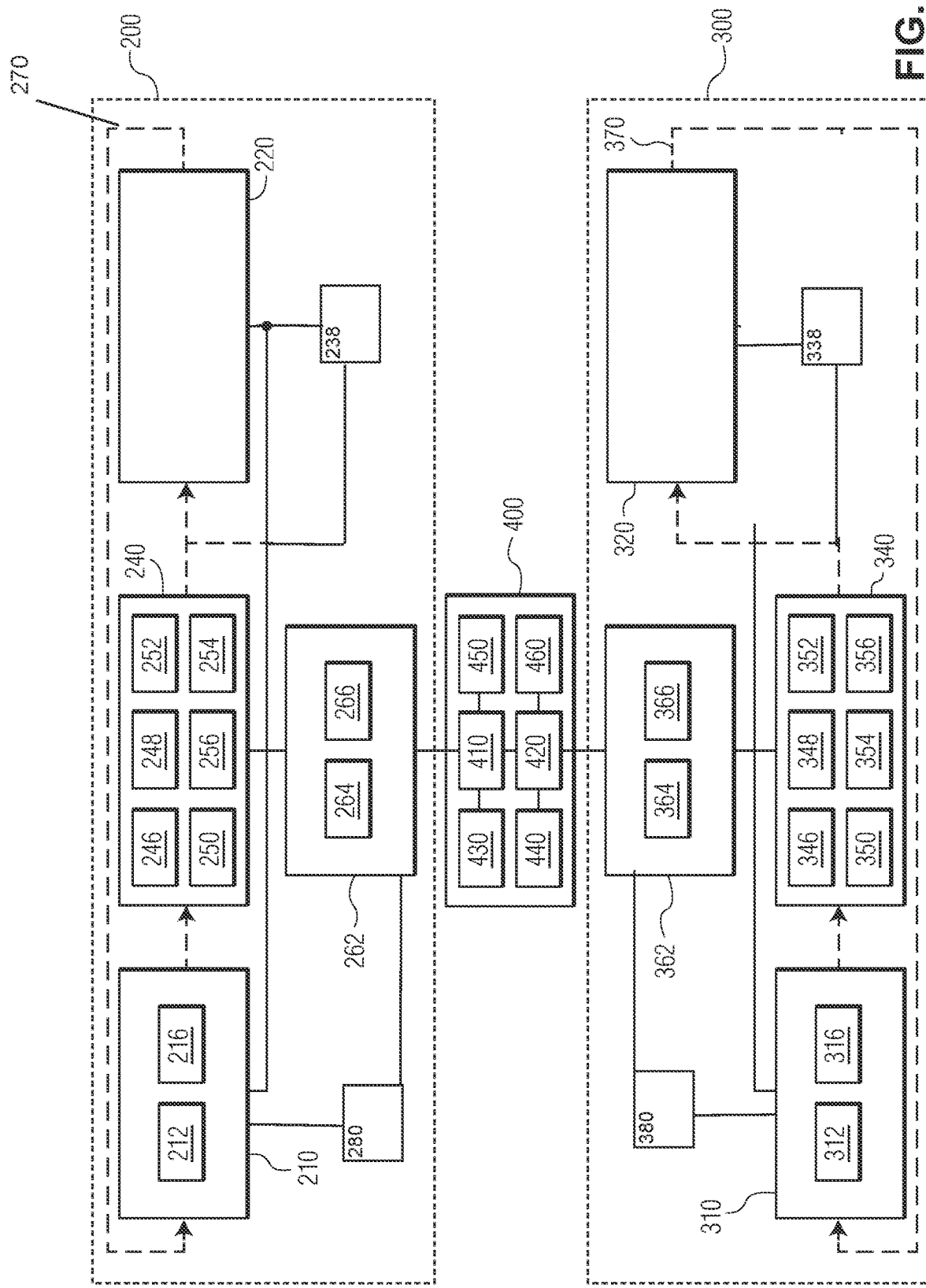
FIG. 17 is a block diagram of the cooling system.

As shown in FIG. 17, the controller 262, 362 of each cooling unit 200, 300 is connected with the condenser 210, 310, the evaporator 240, 340 and the compressor 220, 320 of the respective cooling unit 200, 300 and exchanges data and control instructions with these elements. The controller 262, 362 is connected to and exchanges data and control instructions with the condenser coil 212, 312 and the condenser motor 216, 316 of the condenser 210, 310. The controller 262, 362 is connected to and exchanges data and control instructions with the evaporator motor 246, 346, the evaporator coil 248, 348, the evaporator motor sensor 250, 350, the supply air sensor 252, 352, the return air sensor 254, 354, the defrost sensor 256, 356 of the evaporator 240, 340 and the heating elements 280, 380. The controller 262, 362 is connected to and exchanges data and control instructions with the compressor 220, 320 and the hot gas solenoid valve 238, 338.

A process 600 of using the refrigeration end unit 10 to cool the interior of the known container 500 will now be described in greater detail primarily with reference to FIG. 18.

In a step 610 of the process 600, the first cooling unit 200 and the second cooling unit 300 are started. To start the cooling units 200, 300, a user switches the first switch 450 and the second switch 460 from an off state to an on state. The first switch 450 activates power to the first cooling unit 200 and the second switch 460 activates power to the second cooling unit 300.

A primary cooling unit of the first cooling unit 200 and the second cooling unit 300 is determined in a next step 620 of the process 600. The user interfaces 410, 420 receive an activation signal from the switches 450, 460 and determines when power is activated to the first cooling unit 200 and the second cooling unit 300. In an embodiment, the primary cooling unit is determined by a relative time of turning on the first cooling unit 200 and the second cooling unit 300. In an embodiment, if the activation signals from the switches 450, 460 indicate that the first cooling unit 200 and the second cooling unit 300 were turned on within a specified time of each other, the first cooling unit 200 is determined to be the primary cooling unit and the second cooling unit 300 is determined to be a secondary cooling unit. If the first cooling unit 200 was turned on more than a specified time after the second cooling unit 300, then the second cooling unit 300 is determined to be the primary cooling unit and the first cooling unit 200 is determined to be the secondary cooling unit. In another embodiment, the system interface box 400 may have a primary switch by which the user may select which of the first cooling unit 200 and the second cooling unit 300 is the primary cooling unit. For the purposes of clarity in the following description with reference to FIG. 18, the first cooling unit 200 will be considered to be the initial primary cooling unit and the second cooling unit 300 will be considered the initial secondary cooling unit determined at step 620. However, as would be understood by those with ordinary skill in the art, the same description with reference to FIG. 18 will similarly apply if the second cooling unit 300 is the initial primary cooling unit and the first cooling unit 200 is the initial secondary cooling unit.

Figure 18:
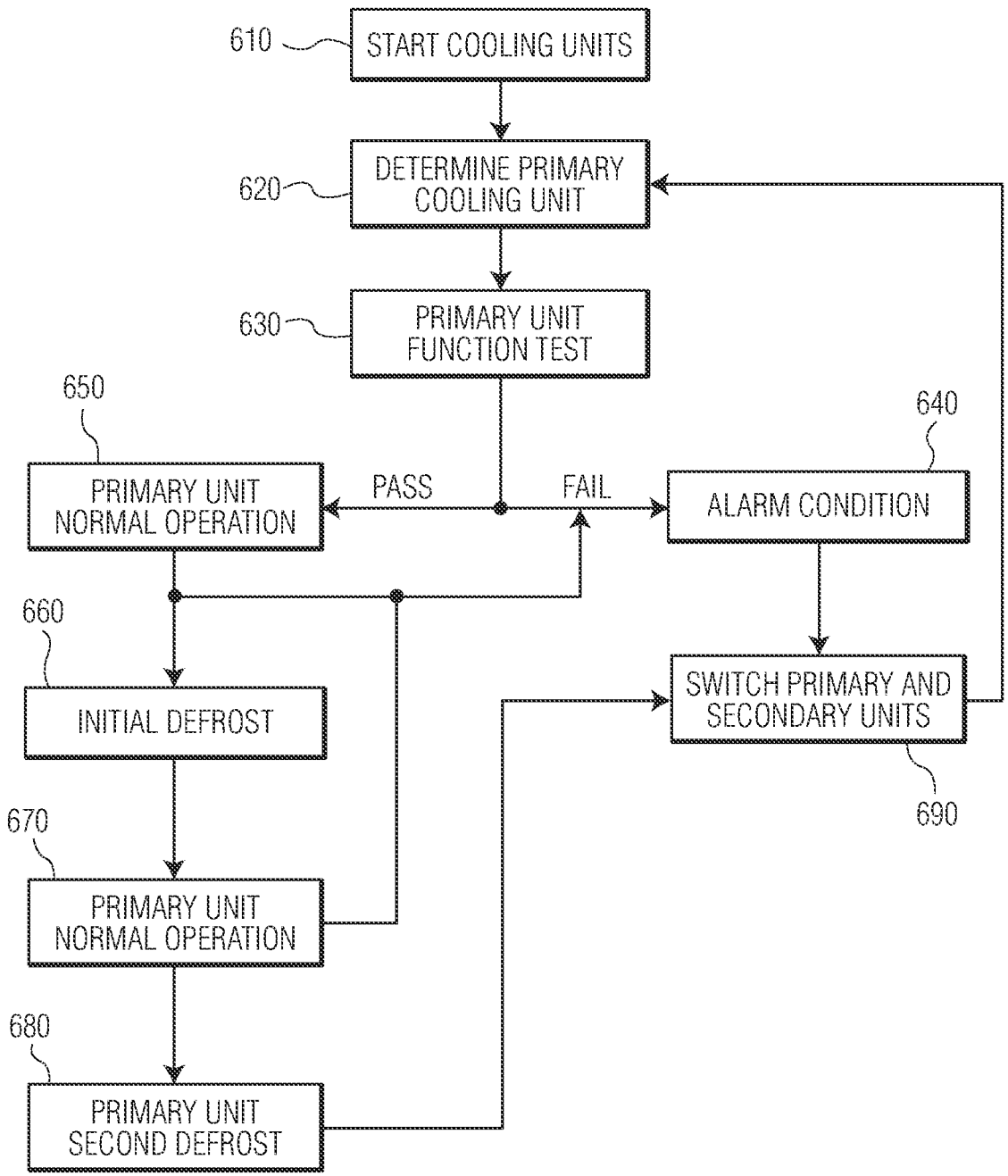
FIG. 18 is a flowchart of a process of cooling an interior of the container using the cooling system.

In a next step 630, as shown in FIG. 18, a function test is performed on the primary cooling unit 200. The function test determines whether an operating ampere data from a number of different elements of the primary cooling unit 200 falls within an appropriate range. The first controller 262 compares the operating ampere data received from each of the elements to an operating ampere data range stored for each element on the first memory 266. If the received operating ampere data for each of the elements falls within the stored operating ampere data range, the first controller 262 determines that the primary cooling unit 200 has passed the function test. If the received operating ampere data for any of the elements falls outside of the corresponding stored operating ampere data range, the first controller 262 determines that the primary cooling unit 200 has failed the function test. The first controller 262 sends a test passed or a test failed message to the first user interface 410 to be output at the first display 412. In an embodiment, as shown in FIG. 17, the first controller 262 of the primary cooling unit 200 receives an operating ampere data from the condenser motor 216, the evaporator motor 246, the compressor 220 and the hot gas solenoid valve 238 in the step 630 and compares each of these to a corresponding stored operating ampere data range. In an embodiment, the stored operating ampere data range can be different for each of the elements.

If the first controller 262 determines that the primary cooling unit 200 has failed the function test, the process proceeds to an alarm condition as shown in step 640 in FIG. 18. In the alarm condition, the first controller 262 of the primary cooling unit 200 sends an alarm signal to the first user interface 410. The alarm signal includes an alarm message and an alarm code stored on the first memory 266 that corresponds to the determined condition. For example, the alarm signal may include an alarm message of "auto test error, amps too low" and an alarm code of a corresponding letter, number, clear text or series of letters and numbers if the received operating ampere data for any of the elements falls below the corresponding stored operating ampere data range. One with ordinary skill in the art would understand that the alarm message and the corresponding alarm code would vary based on the determined condition. In the alarm condition step 640, first the user interface 410 receives the alarm signal and displays the alarm message and/or the alarm code on the first display 412 for the user. The first user interface 410 also outputs the alarm signal at the first alarm 430. In the shown embodiment, the alarm 430 is a lamp that is lit at the alarm condition. The user can use the input 414 to acknowledge the alarm signal on the display 412. In an embodiment, the alarm 430 remains lit until the determined condition is resolved. A step 660 that follows the alarm condition step 640 will be described in greater detail below.

If the first controller 262 determines that the primary cooling unit 200 has passed the function test, the process proceeds with normal operation of the primary cooling unit 200 to cool the interior of the known container 500 in a step 650 shown in FIG. 18. In normal operation, the primary cooling unit 200 cools the interior of the known container 500 in a first cooling loop 270 shown in FIG. 17. The first controller 262 controls the refrigerant to flow through the first cooling loop 270. At the condenser 210, the first controller 262 controls the condenser motor 216 to blow air over the condenser coil 212 to an area exterior of the refrigeration end unit 10, turning the refrigerant received from the compressor 220 into a liquid state with a lower temperature and expelling hot air to the exterior the refrigeration end unit 10.

The refrigerant then enters the evaporator 240, where the first controller 262 controls the evaporator motor 246 to blow air received from the interior of the known container 500 over the evaporator coil 248 that contains the liquid refrigerant with the lower temperature. The liquid refrigerant in the evaporator coil 248 absorbs heat from the passing air and the evaporator motor 246 blows colder air back into the interior of the known container 500, cooling the interior of the known container 500. Liquid refrigerant in the evaporator coil 248, as described above, vaporizes in the evaporator coil 248 as it absorbs heat. The first controller 262 controls the compressor 220 to compress the vaporized liquid refrigerant received from the evaporator 240. The compressor 220 is controlled by the first controller 262 to output the refrigerant in the vapor state with a higher temperature and a higher pressure. This output is received at the condenser 210, restarting the first cooling loop 270.

The first controller 262 operates the first cooling loop 270 in the step 650 to cool the interior of the known container 500 to a predetermined set point temperature. The set point temperature may be set by the user using the input 414 at the user interface 410. The first controller 262 receives the temperature of the return air from the interior of the known container 500 from the return air sensor 254.

In normal operation, the first controller 262 operates the first cooling loop 270 if the return air temperature at the return air sensor 254 is a specified number of degrees above the set point temperature. In an embodiment, the first controller 262 continues to run the first cooling loop 270 for the longer of a fifteen minute period and when the return air temperature reaches the set point temperature. If the return air temperature at the return air sensor 254 is a specified number of degrees below the set point temperature, the first controller 262 stops running the first cooling loop 270 and, in an embodiment, waits a minimum of ten minutes before running the first cooling loop 270 again. Simultaneously, the first controller 262 automatically operates the heating element 280 if the return air temperature at the return air sensor 254 is a specified number of degrees below the set point temperature. The heating element 280 will continue to produce heat until the return air temperature reaches the set point temperature. As noted previously, the second cooling unit 300 mirrors the first cooling unit 200.

In an embodiment, the first cooling loop 270 is capable of maintaining a temperature in the interior of the known container 500 and a range of 0 to −65° C. During the normal operation in step 650, the first controller 262 monitors for additional alarm conditions stored in the first memory 266. The alarm conditions include, for example, a detected temperature of a temperature sensor falling outside of a corresponding temperature range stored in the first memory 266 and a detected pressure of a pressure transducer falling outside of a corresponding pressure range stored in the first memory 266.

In an embodiment, during normal operation in step 650, the first controller 262 receives a detected temperature from sensors of the compressor 220, the evaporator motor sensor 250, the supply air sensor 252, the return air sensor 254, and the defrost sensor 256. The first controller 262 compares the detected temperature from each of the sensors to a first corresponding stored range to determine if the sensor is working properly. The first controller 262 also compares the detected temperature from, the sensors of the compressor 220, and the evaporator motor sensor 250 to a second corresponding stored range to determine if the sensed element is overheating. In an embodiment, the first controller 262 also receives a detected pressure compressor 220. The first controller 262 compares the detected pressure from each of the sensors to a corresponding first stored range to determine if the sensor is working properly and to a corresponding second stored range to determine if the sensed element is working properly. One with ordinary skill in the art would understand that additional and/or other types of sensors could be used in the refrigeration end unit 10 to determine other alarm conditions. If an alarm condition is determined in step 650, the process proceeds to step 640 in FIG. 18. As described above, in the alarm condition step 640, an alarm signal is sent to the first user interface 410, the first user interface 410 displays the alarm message and/or the alarm code on the first display 412 and lights the first alarm 430.

If no alarm condition is determined during normal operation in step 650, the process proceeds to an initial defrost in a step 660 shown in FIG. 18. A defrost operation of the primary cooling unit 200 is required after a period of normal operation to ensure that the first cooling loop 270 is properly cooling the interior of the known container 500. In the defrost operation, the first controller 262 controls the hot gas solenoid valve 238 to divert a hot gas generated by the compressor 220 to the evaporator coil 248. The hot gas diverted to the evaporator coil 248 heats the evaporator coil 248, defrosting the evaporator coil 248 by melting any frost accumulated on the evaporator coil 248 that could impair the heat absorption by the evaporator coil 248 and correspondingly impair the cooling of the interior of the known container 500. The first controller 262 continues to divert the hot gas to the evaporator coil 248 until a defrost temperature received from the defrost sensor 256 rises by a preset limit. In an embodiment, the preset limit of the defrost temperature is an increase of a set number of degrees. A user sets a defrost timer at the first input 414 of the first user interface 410 and the defrost timer is transmitted to and stored on the memory 266. For the initial defrost in step 660, or the first defrost after the primary cooling unit 200 was turned on, the first controller 262 performs the defrost operation after a predetermined portion of the defrost timer has elapsed during operation of the first cooling loop 270. In an embodiment, the predetermined portion is one quarter of the period set in the defrost timer; so that if the defrost timer is set to 24 hours and normal operation of the first cooling loop 270 is run for 6 hours before the initial defrost. The primary cooling unit 200 and the secondary cooling unit 300 remain the same and are not switched during the initial defrost of the primary cooling unit 200. After the initial defrost in step 660, the process proceeds to normal operation in step 670. The normal operation of step 670 is the same as the normal operation of step 650; the first cooling loop 270 and the determination of alarm conditions occurs as described under step 650 above.

If no alarm condition is determined during the normal operation of step 670, the process proceeds to a second defrost in a step 680 shown in FIG. 18. The second defrost is initiated by the first controller 262 by at least one of the defrost timers set at the first input 414, a manual initiation of a defrost initiated by the user at the input 414, and a determination of a relative temperature. In an embodiment of the determination of the relative temperature, the first controller 262 compares a supply air temperature sensed by the supply air sensor 252 and a return air temperature sensed by the return air sensor 254; the first controller 262 initiates the second defrost if the supply air temperature is a specified number of degrees lower than the return air temperature. In another embodiment of the determination of relative temperature, the first controller 262 compares the return air temperature and the defrost temperature sensed by the defrost sensor 256; the first controller 262 initiates the second defrost if the defrost temperature is a specified number of degrees lower than the return air temperature. The defrost operation of the second defrost in step 680 is the same as the defrost operation in the initial defrost of step 660 described above.

As shown in FIG. 18, after the alarm condition in step 640 or after the initiation of the second defrost in step 680, the process proceeds to a step 690. In the step 690, the primary cooling unit, described by way of example with reference to the first cooling unit 200 above, is switched to the secondary cooling unit and the secondary cooling unit, described by way of example with reference to the second cooling unit 300 above, is switched to the primary cooling unit.

In the step 690, the first controller 262 of the previously primary first cooling unit 200 sends a switch signal to the second controller 362 of the previously secondary second cooling unit 300 either at the determination of the alarm condition or at the initiation of the second defrost. The first cooling unit 200 then enters a standby state from the normal operation state. The second cooling unit 300 switches from the standby state to the normal operation state and, looping back to step 620, the second cooling unit 300 becomes the primary cooling unit 300 and the first cooling unit 200 becomes the secondary cooling unit 200. The process shown in FIG. 18 then executes the same steps 630-690 described above with the second cooling unit 300 as the primary cooling unit 300. The function test is performed on the primary cooling unit 300 in step 630; the alarm condition is determined in step 640 if the primary cooling unit 300 fails the function test, and the primary cooling unit 300 enters normal operation in step 650 if the primary cooling unit 300 passes the function test. The same operations apply to the second cooling unit 300 as the primary cooling unit as described with respect to the first cooling unit 200 as the primary cooling unit above, with the similar reference numbers and elements of the second cooling unit 300 performing the same functions as the counterparts in the first cooling unit 200. The second cooling unit 300 runs a second cooling loop 370 shown in FIG. 17 during normal operation to cool the interior of the known container 500. The second cooling unit 300 as the primary cooling unit 300 engages in normal operation in step 650, undergoes an initial defrost in step 660, and again executes normal operation in step 670. In the standby state, the first cooling unit 200 serving as the secondary cooling unit 200 does not run the first cooling loop 270. Either the first cooling loop 270 or the second cooling loop 370 is operating at a given time.

When the second cooling unit 300 as the primary cooling unit 300 reaches the alarm condition in step 640 or the second defrost in step 680, the process again switches the primary and secondary cooling units provided any alarm in the secondary cooling unit 200 has been resolved. The process shown in FIG. 18 continues to loop, switching the primary cooling unit that is responsible for cooling the interior of the known container 500 between the first cooling unit 200 and the second cooling unit 300 based on the presence of an alarm condition or a non-initial defrost. The refrigeration end unit 10 thereby avoids using a malfunctioning cooling unit 200, 300 to cool the interior of the known container 500. The refrigeration end unit 10 thereby also avoids the heat generated during the non-initial defrost operations from raising the temperature in the interior of the known container 500 by using the other cooling unit to cool the interior of the known container 500 while the first cooling unit is defrosting. The refrigeration end unit 10 thus avoids even small temperature variations during storing or shipping while maintaining the interior of the known container 500 at the predetermined set point temperature.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalent.

What is claimed is:

1. A picture frame refrigerant system for a known shipping container, comprising
    a refrigeration end unit secured to and extending to an open end of the known shipping container, the refrigeration unit having:
    a body secured to the open end and having a plurality of enclosures;
    a first cooling unit;
    a second cooling unit,
    an evaporator enclosure positioned in an upper central portion of the body and housing a first evaporator of the first cooling unit and a second evaporator of the second cooling unit,
    a cooling enclosure positioned below the evaporator enclosure and having a pair of cooling unit enclosures to house the first cooling unit and the second cooling unit respectively, and
    a system interface box connected to the first cooling unit and second cooling unit and adapted to power on or power off the first cooling unit and the second cooling unit in a redundant manner.

2. The picture frame refrigerant system of claim 1, wherein the system interface box is positioned between the first cooling unit and second cooling unit.

3. The picture frame refrigerant system of claim 2, wherein the refrigeration end unit is a box like structure secured to the known container using a plurality of fasteners.

4. The picture frame refrigerant system of claim 1, wherein the first cooling unit includes a first condenser, a first compressor, and the first evaporator controlled by a processing unit of the system interface box.

5. The picture frame refrigerant system of claim 4, wherein the second cooling unit includes a second condenser, a second compressor, and the second evaporator controlled by the processing unit.

6. The picture frame refrigerant system of claim 1, wherein the cooling enclosure further includes a system interface box slot positioned between the pair of cooling unit enclosures and receiving the system interface box.

7. The picture frame refrigerant system of claim 6, further comprising a condenser enclosure positioned adjacent and below the cooling enclosure and having a condenser coil housing receiving a first set of condenser coils for the first cooling system and a second set of condenser coils for the second cooling system.

8. The picture frame refrigerant system of claim 7, wherein the first set of condenser coils are positioned orthogonal to a first condenser fan.

9. The picture frame refrigerant system of claim 1, wherein the first cooling unit and the second cooling unit are positioned such as the to mirror each other.

10. A picture frame refrigerant system for a known shipping container, comprising
    a refrigeration end unit secured to and extending to an open end of the known shipping container, the refrigeration unit having:
    a body secured to the open end and having a plurality of enclosures;
    a first cooling unit;
    a second cooling unit, and
    a system interface box connected to the first cooling unit and second cooling unit and adapted to power on or power off the first cooling unit and the second cooling unit in a redundant manner,
    wherein the first cooling unit includes a first condenser, a first compressor, and a first evaporator controlled by a processing unit of the system interface box,
    wherein the second cooling unit includes a second condenser, a second compressor, and a second evaporator controlled by the processing unit,
    the picture frame refrigerant system further comprising:
    an evaporator enclosure positioned in an upper central portion of the body and housing the first evaporator and the second evaporator, and
    a cooling enclosure positioned below the evaporator enclosure and having a pair of cooling unit enclosures to house the first cooling unit and the second cooling unit respectively,
    wherein the cooling enclosure further includes a system interface box slot positioned between the pair of cooling unit enclosures and receiving the system interface box.

* * * * *